May 21, 1963
A. H. CANADA
3,090,830
OPTICAL IMAGE FEEDBACK
Filed Jan. 30, 1961
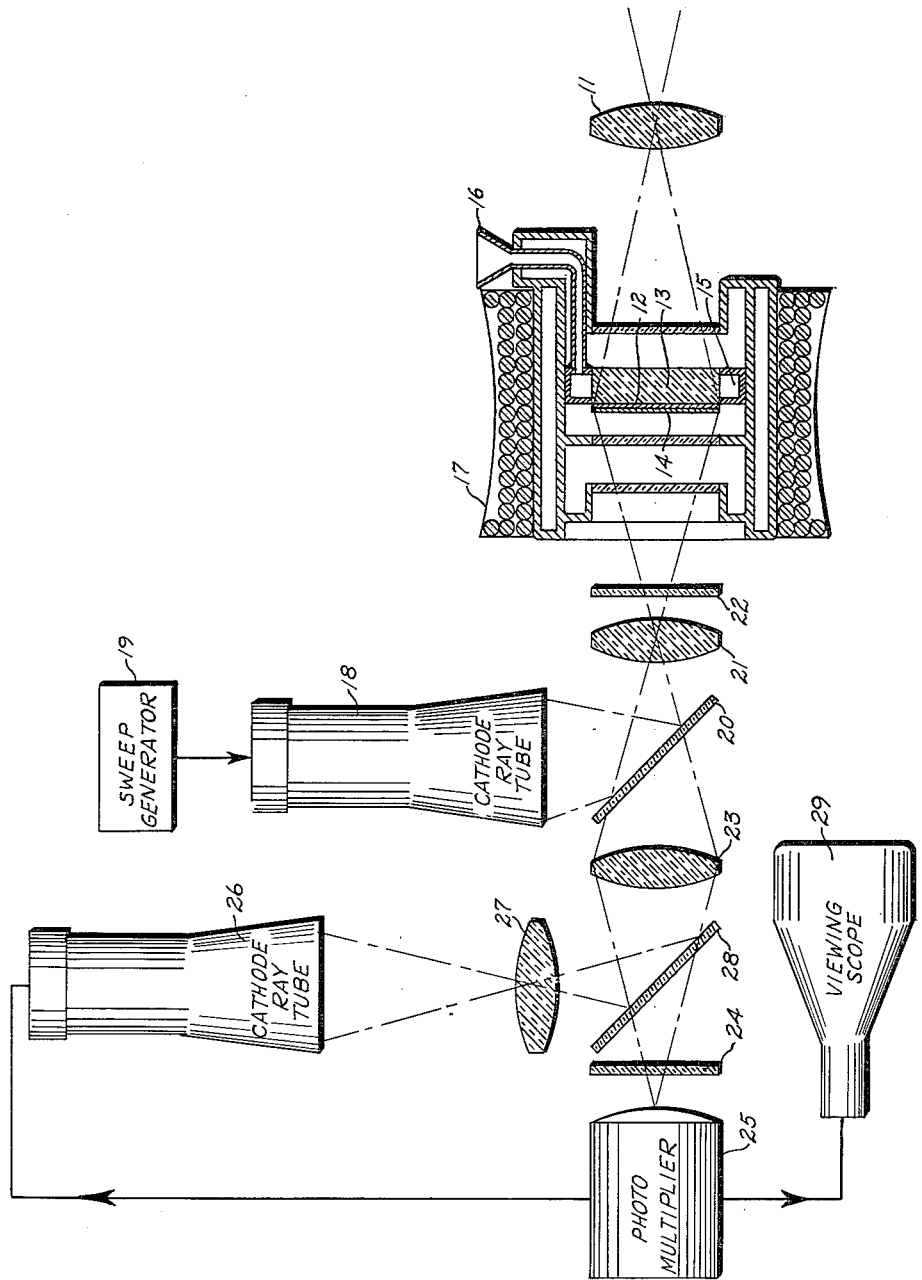
INVENTOR.
ALFRED H. CANADA
BY
H. H. Losche
Paul S. Collignon
ATTORNEYS

3,090,830
OPTICAL IMAGE FEEDBACK
Alfred H. Canada, Falls Church, Va., assignor, by mesne assignments, to the United States of America as represented by the Secretary of the Navy
Filed Jan. 30, 1961, Ser. No. 85,940
5 Claims. (Cl. 178—6.8)

The present invention relates to a thermal imaging device and more particularly to an imaging system having optical feedback means for providing a uniform sensitive surface on an image tube.

Thermal image tubes are subject to producing a nonuniform image of a target for various reasons. One spot of the surface may be at a first temperature and another spot at a different temperature. Also nonuniformity arises due to the variations in the photoemissive material and variations in the flux field provided in some detectors.

One heretofore proposed solution for eliminating non-uniformities in the photoemitter consists in adjusting the amplitude of the signal due to the thermally insensitive part and subtracting it from the signal due to the thermally sensitive part. However, one disadvantage of this heretofore proposed solution is that a special image tube is required having a plurality of parts including two grids having different sizes of mesh.

The present invention employs an image tube that uses a paramagnetic material, such as cerium salts, that show a marked Faraday effect. The Faraday effect is the rotation of the plane of polarization of a light beam when it is passed through a magnetized substance in the direction of the applied field. The amount of rotation is proportional to the magnetization of the paramegnetic material and for most of these materials the magnetization is essentially proportional to the applied field. The Faraday effect material is deposited on one side of an optical material transparent to thermal radiation such as a germanium block having a grey tin surface or other suitable superconductor material on the opposite side.

In order to read the surface of the image tube, a standard flying spot scanner technique is employed which is produced by a first cathode ray tube. The spot from the cathode ray tube is projected through a beam splitter, a lens, and a polarizer onto the Faraday surface. The spot is reflected from the Faraday surface and is imaged by the lens into a field lens and then through a second polarizer into a photomultiplier unit.

With the incoming energy blocked-off, the nonuniformity of the image on the Faraday effect surface is observed electronically and stored as a negative image on a second cathode ray tube. The negative image is projected onto the temperature sensitive surface and all parts of the surface are then raised to the higher temperature level. Thus a uniform image is obtained. If the image tube looks at a view with widely variable backgrounds, the optical feedback can be used to smooth out the pattern and then hold a uniform level. Any change, as caused by a moving target, for example, will show up as a new image.

It is therefore a general object of the present invention to provide an improved thermal imaging system.

Another object of the present invention is to provide a uniform sensitive surface for an infrared image tube.

Still another object of the present invention is to feed back an optical image onto a thermal sensitive surface to produce a uniform image.

Other objects and advantages of the present invention will be readily appreciated as the same becomes better understood by reference to the following detailed description when considered in connection with the accompanying drawing which is a diagrammatic representation of a preferred embodiment of the present invention.

Referring now to the drawing, an external lens 11 is provided in order to form an image from a distant radiating target onto a thermal sensitive surface 12, such as a grey tin surface, which has been deposited on one side of a germanium block 13. A paramagnetic material 14, such as a cerium salt, is deposited over the thermal sensitive surface 12 to provide a Faraday effect surface. A cooling chamber 15 surrounds germanium block 13 and a filler pipe 16 is provided for supplying liquid helium into chamber 15 for the purpose of cooling the thermal sensitive surface 12 to its superconducting point. Coil 17 provides the necessary magnetic field for the Faraday effect.

The Faraday effect surface 14 is read by a standard flying spot scanner technique which is produced by cathode ray tube 18, which is driven by sweep generator 19. As can be seen in the drawing, the spot from tube 18 is projected onto surface 14 by a beam splitter 20, lens 21, and polarizer 22. The spot of light is reflected from surface 14 and is imaged by lens 21 into a field lens 23, and then the spot of light passes through polarizer 24 into photomultiplier 25.

A second cathode ray tube 26 is provided, and with the incoming infrared image blocked-off, the nonuniformity of the detection is observed electronically and stored as a negative image on tube 26. This negative image is fed back onto surface 12 by means of lens 27 and a second beam splitter 28. With the negative image projected onto the temperature sensitive surface 12, all parts of surface 12 are raised to the higher temperature level and there is a uniform image present. This uniform image can then be projected onto a viewing scope 29 for observation. By regulation of the flow of liquid helium, the entire surface can be depressed back to the lower temperature level, is so desired.

In operation, an image from a target emitting infrared energy is projected onto the thermal sensitive surface 12. A flying spot of light is transmitted from cathode ray tube 18 and by way of beam splitter 20, lens 21, and polarizer 22, the spot traverses the thermal sensitive surface 12 through the Faraday effect surface 14. As the spot of light from tube 18 is polarized by element 22 and is traveling parallel to the applied field created by coil 17, when the light passes through the paramagnetic material 14 it is rotated due to the Faraday effect. Since these rotations are doubled, not cancelled, when the light is reflected from the thermal sensitive surface 12, the light reflected from the higher temperature areas of surface 12 have a different plane of polarization from that reflected from the lower temperature areas and such differences are detected by the photomultiplier unit 25.

With the infrared energy blocked-off from the target, the nonuniformity of the infrared image on surface 12 is stored as a negative image on cathode ray tube 26 and then projected back onto the thermal sensitive surface 12. Thus all parts of the thermal sensitive surface 12 are raised to the same temperature. The optical feedback does not affect the contrast in a thermal device as it would in either a photoemissive or photoconductive device. The optical feedback also has another advantage. When the image tube looks at a view with widely variable backgrounds, yet having relatively fixed positions, the optical feedback can be used to smooth out the pattern and then hold that data. Any change, as for example that which is caused by a moving target, will show up as a new image and can be viewed on scope 29.

It can thus be seen that the present invention provides an improved thermal imaging system feeding back an optical image onto a thermal sensitive surface.

Obviously many modifications and variations of the present invention are possible in the light of the above teachings. It is therefore to be understood, that within the scope of the appended claims, the invention may be practiced otherwise than as specifically described.

What is claimed is:

1. A device for converting a thermal image into a video image comprising: an imaging tube having a Faraday effect surface, a thermal sensitive surface, and a magnetic field surrounding said Faraday effect surface; means for scanning said Faraday effect surface with a polarized spot of light, means for converting light reflected from said Faraday effect surface into a negative image, means for projecting said negative image onto said thermal sensitive surface; and means for remote electrical viewing of said thermal sensitive surface while said negative image is projected onto said thermal sensitive surface.

2. A device for converting a thermal image into a video image as set forth in claim 1 wherein said imaging tube is provided with cooling means for controlling the brightness of said thermal sensitive surface.

3. A device for converting a thermal image into a video image comprising: an imaging tube having magneto-optical rotational properties; means for scanning said imaging tube with a polarized spot of light; a cathode ray tube for converting into a negative image light reflected from said imaging tube; means for projecting said negative image onto said imaging tube; and means for remote electrical viewing of said imaging tube while said negative image is projected thereon.

4. A device for converting a thermal image into a video image as set forth in claim 3 wherein said imaging tube is comprised of a germanium block having a thermal sensitive surface, a Faraday effect surface in contact with said thermal sensitive surface, and a magnetic field surrounding said germanium block.

5. A device for converting a thermal image into a video image as set forth in claim 4 wherein said imaging tube is provided with cooling means for controlling the brightness of said thermal sensitive surface.

References Cited in the file of this patent

UNITED STATES PATENTS

| | | |
|---|---|---|
| 2,870,370 | Garbuny | Jan. 20, 1959 |
| 2,999,184 | Hansen | Sept. 5, 1961 |